United States Patent [19]

Machado

[11] Patent Number: 5,210,137
[45] Date of Patent: May 11, 1993

[54] POLYKETONE POLYMER BLENDS

[75] Inventor: Joseph M. Machado, Richmond, Tex.

[73] Assignee: Shell Oil Company, Houston, Tex.

[21] Appl. No.: 615,744

[22] Filed: Nov. 19, 1990

[51] Int. Cl.$^5$ .................. C08G 67/02; C08L 61/00
[52] U.S. Cl. ................... 525/154; 525/153; 525/185; 525/539
[58] Field of Search ............... 525/154, 153, 185, 539

[56] References Cited

U.S. PATENT DOCUMENTS

| | | | |
|---|---|---|---|
| 2,495,286 | 9/1972 | Nozaki | 260/63 |
| 2,947,727 | 8/1960 | Bartz | 260/67 |
| 2,947,728 | 8/1960 | Bartz | 260/67 |
| 3,027,352 | 3/1962 | Walling et al. | 260/67 |
| 3,072,609 | 1/1963 | Berardinelli et al. | 260/67 |
| 3,694,412 | 9/1972 | Nozaki | 260/63 |
| 3,869,292 | 3/1975 | Peters | 96/115 R |
| 4,028,340 | 6/1977 | Kanezaki | 260/47 |
| 4,274,986 | 6/1981 | Ikenaga et al. | 260/22 |
| 4,439,516 | 3/1984 | Cernigliaro et al. | 430/323 |
| 4,517,349 | 5/1985 | Fujiwara et al. | 526/313 |
| 4,812,522 | 3/1989 | Handlin, Jr. | 525/153 |
| 4,816,530 | 3/1989 | Lutz et al. | 525/472 |
| 4,843,144 | 6/1989 | Van Broekhoven et al. | 528/392 |
| 4,880,903 | 11/1989 | Van Broekhoven et al. | 528/392 |
| 5,079,301 | 1/1992 | Machado et al. | 525/154 |

FOREIGN PATENT DOCUMENTS

| | | |
|---|---|---|
| 138609 | 4/1985 | European Pat. Off. |
| 807589 | 1/1959 | United Kingdom |
| 1081304 | 8/1967 | United Kingdom |

*Primary Examiner*—James J. Seidleck
*Assistant Examiner*—Thomas Hamilton, III
*Attorney, Agent, or Firm*—Denise Y. Wolfe

[57] ABSTRACT

Improved compositions comprise polymer blends of a linear alternating polymer of carbon monoxide and at least one ethylenically unsaturated hydrocarbon with polyvinyl phenol and polyacetal.

10 Claims, No Drawings

POLYKETONE POLYMER BLENDS

FIELD OF THE INVENTION

This invention relates to polyketone blends, and, more particularly, to blends of a polyketone, a polyvinyl phenol, and a polyacetal.

BACKGROUND OF THE INVENTION

The class of polymers of carbon monoxide and olefins has been known for some time. U.S. Pat. No. 2,495,286 (Brubaker) discloses such polymers of relatively low carbon monoxide content in the presence of free radical initiators, e.g., peroxy compounds. G.B. 1,081,304 discloses similar polymers of higher carbon monoxide content in the presence of alkylphosphine complexes of palladium compounds as catalyst. U.S. Pat. No. 3,694,412 (Nozaki) extended the reaction to produce linear alternating polymers in the presence of arylphosphine complexes of palladium moieties and certain inert solvents.

More recently, the class of linear alternating polymers of carbon monoxide and at least one ethylenically unsaturated hydrocarbon, now becoming known as polyketones or polyketone polymers, has become of greater interest. U.S. Pat. No. 4,880,903 (VanBroekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven et al.) discloses a process for preparing polymers of carbon monoxide and at least one ethylenically unsaturated hydrocarbon using the preferred catalyst comprising a compound of palladium, the anion of a non-hydrohalogenic acid having a pKa of below about 6 and a bidentate ligand of phosphorus.

The resulting polymers are relatively high molecular weight materials having established utility as premium thermoplastics in the production of shaped articles, such as containers for food and drink and parts for the automotive industry, which are produced by processing the polyketone polymer according to well known methods.

For some particular applications it has been found to be desirable to have properties for a polymeric composition which are somewhat different from those of the polyketone polymers. It would be of advantage to retain the more desirable properties of the polyketone polymers and yet improve other properties. These advantages are often obtained through the provision of a polymer blend. A blend of a polyketone polymer and a polyvinyl phenol polymer is disclosed in U.S. Pat. No. 4,812,522 (Handlin, Jr.). A blend of a polyketone polymer and a polyacetal polymer is disclosed in U.S. Pat. No. 4,816,530.

Polyketone polymers, when combined with polyacetal polymers, produce immiscible blends of relatively low compatability. Polyvinyl phenol may be used to compatibilize blends of polyketone and polyacetal, since it is miscible with both polymers. Thus, blends of polyketone polymer and polyacetal polymer containing small amounts of polyvinyl phenol demonstrate properties that are better than those for a binary blend of polyketone and polyacetal.

It is an object of this invention to provide compatible blends of polyketone, polyvinyl phenol, and polyacetal polymers.

SUMMARY OF THE INVENTION

The present invention provides blends of a linear alternating polymer of carbon monoxide and at least one ethylenically unsaturated hydrocarbon with a polyvinyl phenol and a polyacetal.

DESCRIPTION OF THE INVENTION

The polyketone polymers of the blends of the invention are of a linear alternating structure and contain substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms, and are aliphatic such as ethylene and other $\alpha$-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an $\alpha$-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polyketone polymers is therefore represented by the repeating formula

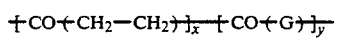

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO—CH$_2$CH$_2$— units and the —CO—G— units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature and proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 (Van Broekhoven et al.). The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

The polyvinyl phenols employed as the second component in the molecularly miscible blends of the invention are homopolymers and copolymers of ortho-, meta- and para-vinyl phenols. Polyvinyl phenols may be illustrated by the following formula for para-vinyl phenol:

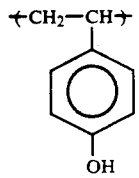

The vinyl phenols polymerized may be non-substituted or may carry any of various substituents that do not markedly affect the phase behavior of the polymer blend.

The molecular weight of the polymer does not appear to be a critical factor. Those having a number average molecular weight of between 2,000 and 75,000 are preferred, but the polymers having molecular weights lower or higher than this range may also be used.

The polyvinyl phenol may be prepared by bulk polymerization, emulsion polymerization or solution polymerization of the corresponding monomers in the presence of a cationic catalyst such as boron trifluoride etherate. Such procedures are well known in the art.

High purity para-vinyl phenol polymers may be prepared by several methods known in the art. A high purity para-vinyl phenol polymer may be produced by polymerizing para-vinyl phenol in the presence of phenols without unsaturated side chains, and in the presence of a polymerization accelerator. High purity para-vinyl phenol may also be produced by dehydrogenating crude para-ethylphenol, polymerizing the resulting crude para-vinyl phenol without purification, and then purifying the resulting polymerization product. Hoechst Celanese commercially produces a high purity para-vinyl phenol polymer by polymerization of a high purity para-acetoxystyrene monomer, followed by hydrolysis to para-vinyl phenol polymer.

Vinyl phenols useful for the production of polymers may be prepared, for example, by hydrolysis of commercially available coumarin or substituted coumarins, followed by decarboxylation of the resulting hydroxy cinnamic acids. Useful vinyl phenols may also be prepared by dehydration of the corresponding hydroxy alkyl phenols or by decarboxylation of hydroxy cinnamic acids resulting from the reaction of substituted or non-substituted hydroxybenzaldehydes with malonic acid. Various processes suitable for production of vinyl phenol are well known in the art.

Polyvinyl phenols are described in U.S. Pat. No. 3,869,292 (Peters) and in U.S. Pat. No. 4,439,516 (Cernigliaro et al.), both of which are incorporated herein by reference, and in European Patent Application 138,609 (Nippon Oil). The production of high-purity p-vinyl phenols is described in U.S. Pat. No. 4,028,340 (Kanezaki) and in U.S. Pat. No. 4,517,349 (Fujiwara et al.), both of which are incorporated herein by reference.

The precise percentage of the polyvinyl phenol polymer to be employed in the blends of the invention will depend upon the end use for the blend. Compositions containing from about 0.5 wt % to about 10 wt %, based on total blend, are useful for compatibilizing the polyketone and polyacetal polymers.

The polyacetal polymer employed as the third component in the blends of the invention is a polyoxyalkylene polymer which is at least predominantly a polyoxymethylene polymer. The polymer is illustratively produced by polymerization of formaldehyde, provided as such or from a formaldehyde source, and optionally has polymerized therewith a small proportion of a second compound such as a low molecular weight cylic ether which is not a formaldehyde source. One preferred formaldehyde source is 1,3,5-trioxane which is viewed as a formaldehyde trimer. The cyclic ether which is preferred as an optional comonomer of the polyacetal polymer is a low molecular weight cyclic ether of up to 10 carbon atoms inclusive and up to 2 oxygen atoms inclusive. One class of such cyclic ethers is the group of compounds known as oxirane compounds or olefin oxides having two carbon atoms and one oxygen atom in a cyclic three-membered ring. Such olefin oxides have up to 10 carbon atoms inclusive and are suitably hydrocarbon olefin oxides such as ethylene oxide, propylene oxide, 2-butylene oxide and 1-octene oxide or are halohydrocarbon olefin oxides, preferably chlorohydrocarbon olefin oxides such as epichlorohydrin. Other cyclic ethers with one oxygen but more than two carbon atoms in the ring are the polymethylene oxides including hydrocarbon polymethylene oxides such as trimethylene oxide, tetramethylene oxide and pentamethylene oxide as well as halohydrocarbon, preferably chlorohydrocarbon, polymethylene oxides such as 2,2-di(chloromethyl)trimethylene oxide. Cyclic ethers of more than one oxygen in the ring, such as 1,3-dioxolane and 1,4-dioxane, are preferred.

The polyacetal resin prepared from formaldehyde has a high molecular weight and a structure typified by the following:

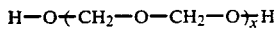

where terminal groups are derived from controlled amounts of water and the x denotes a large (typically 1500) number of formaldehyde units linked in head-to-tail fashion. To increase thermal and chemical resistance, terminal groups are typically converted to esters or ethers.

Also included in the term polyacetal resins are the polyacetal copolymers, such as those listed in British Patent No. 807,589 (Du Pont), which include other monomers capable of providing active hydrogens, such as alkylene glycols, polythiols, vinyl acetate/acrylic acid copolymers, or reduced butadiene/acrylonitrile polymers.

Preferred polyacetal polymers comprise at least 85 mole percent, preferably at least 90 mole percent, based on total polyacetal polymer of polyoxymethylene, the unit derived from formaldehyde, with an optional amount of no more than 15 mole percent, preferably no more than 10 mole percent, based on total polyacetal polymer, of a cyclic ether polymerized with the polyoxyalkylene. Although block copolymers of formaldehyde are known wherein a polyoxymethylene block is attached to a block of a second polymerized monomer, e.g., the cyclic ether, the preferred polyacetal polymers, when copolymers are employed, are the more typical random copolymers, wherein the monomers are copolymerized and the moieties of cyclic ether occur randomly throughout the polymer chain. Although such copolymers are suitable for the blends of the invention it is generally preferred to use homopolymers of formaldehyde without any substantial amount of comonomer.

Such preferred polyacetal polymers, are represented by the repeating formula

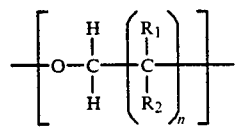

wherein each $R_1$ and $R_2$ independently is hydrogen, an alkyl radical containing up to 4 carbon atoms, or a haloalkyl of up to 4 carbon atoms and 2 halogens inclusive, preferably a haloalkyl of up to 1 halogen wherein the halogen is chloro, and n is an integer from 0 to 3 inclusive, with n being 0 in at least 85% of the repeating units. These polyacetal polymers are produced by polymerizing at least 85 mole percent of formaldehyde with up to 15 mole percent, based on total polyacetal polymer, of the cyclic ether of the formula

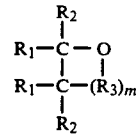

wherein each $R_1$ and $R_2$ is hydrogen, an alkyl of up to 4 carbon atoms inclusive, or a haloalkyl of up to 4 carbon atoms and 2 halogens inclusive, preferably haloalkyl of up to 1 halogen wherein the halogen is chloro; $R_3$ is methylene, oxymethylene, alkyl or haloalkyl substituted methylene, or alkyl or haloalkyl substituted oxymethylene; and m is an integer from 0 to 3 inclusive. Illustrative cyclic ethers are described above. Preferred cyclic ethers for copolymerization with formaldehyde when copolymer polyacetal polymers are employed are ethylene oxide and 1,3-dioxolane. Certain of the preferred formaldehyde/ethylene oxide copolymers are commercially available and are marketed by Hoechst Celanese under the tradename CELCON ® Polyacetal. A polyacetal molding composition is described in U.S. Pat. No. 4,274,986 (Ikenaga et al.), assigned to Celanese, and incorporated herein by reference. Other polyacetal homopolymers and copolymers are available from Du Pont under the tradename DELRIN ® Polyacetal.

The polyacetal polymers are produced by polymerization of formaldehyde (or a formaldehyde source) and, optionally, up to 15 mole percent of the cyclic ether comonomer in the presence of a Friedel Crafts catalyst, preferably complexed with an electron-rich molecule. The Friedel Crafts catalysts are metal halides having acidic properties. This class of catalysts include the halides but preferably the fluorides or chlorides of boron, aluminum, iron, tin and other metals as is known in the art. The catalysts are often provided as a complex of an electron-rich oxygen compound such as an ether, but complexes with an alkanol or an alkanoic acid are also suitable. The production of polyacetal polymers is well known in the art and is taught by U.S. Pat. No. 2,947,727 and U.S. Pat. No. 2,947,728 (both Bartz), U.S. Pat. No. 3,027,352 (Walling) and U.S. Pat. No. 3,072,609 (Berardinelli).

The precise percentage of the polyacetal polymer to be employed in the blends of the invention will depend upon the anticipated end use for the blend. Compositions containing from about 15 wt % to about 65 wt %, based on total blend, provide useful properties, with 20 wt % to 45 wt % being preferred.

The blends of the invention may also include additives such as antioxidants and stabilizers, dyes, fillers or reinforcing agents, fire resistant materials, mold release agents, colorants and other materials designed to improve the processability of the polymers or the properties of the resulting blend. Such additives are added prior to, together with or subsequent to the blending of the polyketone and the other components.

The method of producing the blends of the invention is not material so long as a uniform blend is produced without undue degradation of the blend or its components. In one modification the polymer components of the blend are extruded in a corotating twin screw extruder to produce the blend. In an alternate modification, the polymer components are blended in a mixing device which exhibits high shear. The blends are processed by methods such as extrusion and injection molding into sheets, films, plates and shaped parts. Illustrative of such applications are the production of articles useful in both rigid and flexible packaging applications. Specific applications include films, containers, and bottles, which may be made by thermoforming injection or extrusion blow molding, etc. The blends find particular utility in the production of both internal and external parts for the automotive industry and structural parts for application in the construction industry. The blends of the invention could also be used as coatings for materials such as glass or metal.

The invention is further illustrated by the following Examples, which should not be construed as limiting the invention.

EXAMPLE 1

A linear alternating terpolymer of carbon monoxide, ethylene and propylene (P1000-2) was produced in the presence of a catalyst composition formed from palladium acetate, trifluoroacetic acid and 1,3-bis[di(2-methoxyphenyl)phosphino]propane. The polyketone polymer had a melting point of about 220° C. and an LVN of about 1.8 dl/g when measured in m-cresol at 60° C. The polyketone polymer also contained 0.5% Ethanox 330 and 0.5% Nucrel 535.

EXAMPLE 2

Blends were prepared of (1) the polyketone terpolymer of Example 1, (2) a polyvinyl phenol having a number average molecular weight of 50,500 and a density of 1.16 g/cc, purchased from Hoechst Celanese, and/or (3) a molding grade polyacetal copolymer with a density of 1.42 g/cc, CELCON M-90, purchased from Hoechst Celanese. The blends prepared are shown in Table 1. The blends were compounded on a 30 mm Haake co-rotating, intermeshing twin screw extruder operating at 230° C. Subsequent to blending, specimens of the blends were injection molded at 250° C. into test specimens using an Arburg 25 ton injection molding machine. The molded specimens were stored over desiccant prior to testing. Mechanical testing was performed on "dry as molded" specimens.

TABLE 1

| Polyketone (wt %) | Polyvinyl Phenol (wt %) | Polyacetal (wt %) | Tensile Strength (psi) | Tensile Elongation (%) |
|---|---|---|---|---|
| 100 | 0 | 0 | 8750 | 329 |
| 91 | 9 | 0 | 8750 | 203 |
| 75 | 0 | 25 | 8600 | 94 |
| 68 | 9 | 23 | 9000 | 100 |
| 50 | 0 | 50 | 7570 | 8 |
| 45.5 | 9 | 45.5 | 9250 | 10 |
| 25 | 0 | 75 | 8130 | 14 |
| 23 | 9 | 68 | 8040 | 5 |
| 0 | 0 | 100 | 8700 | 25 |
| 0 | 9 | 91 | 6540 | 4 |

Tensile strength and elongation may be used as a measure of the compatibility of the blends. The compositions containing 23 wt % to 45.5 wt % polyacetal, plus 9 wt % polyvinyl phenol to compatibilize the polyketone and polyacetal, exhibited tensile strengths better than the neat polyketone polymer.

With respect to tensile properties, polyvinyl phenol provides no benefit when added to the neat polyketone or polyacetal. However, when polyvinyl phenol is added to binary polyketone/polyacetal blends, improvements in tensile properties are observed (particularly for blends rich in polyketone). These improvements are a result of compatibilization of the blend. Electron microscopy studies also clearly demonstrated that the phase domains of the two major components became much smaller as polyvinyl phenol was added to the blend. That is, the blend components are more thoroughly and easily dispersed in the presence of polyvinyl phenol.

What is claimed is:

1. A polymer blend composition comprising:
   (1) about 45 wt %, based on the total blend, of a linear alternating polyketone polymer of carbon monoxide and at least one ethylenically unsaturated hydrocarbon, wherein the linear alternating polyketone polymer is represented by repeating units of the formula

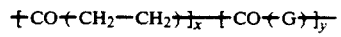

wherein G is a moiety of an ethylenically unsaturated hydrocarbon of at least 3 carbon atoms polymerized through the ethylenic unsaturation and the ratio of y:x is no more than about 0.5,
   (2) about 10 wt %, based on the total blend, of a polyvinyl phenol polymer; and
   (3) about 45 wt %, based on the total blend, of a polyacetal polymer.

2. The composition of claim 1 wherein the polyvinyl phenol polymer is produced by polymerizing a high purity para-acetoxystyrene monomer, followed by hydrolysis to form a high purity para-vinyl phenol polymer.

3. The composition of claim 1 wherein the polyacetal polymer is represented by the formula

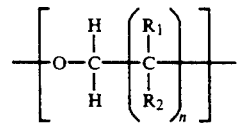

wherein each $R_1$ and $R_2$ is hydrogen, alkyl of up to 4 carbon atoms inclusive, or haloalkyl of up to 4 carbon atoms, and n is an integer from 0 to 3 inclusive with n being 0 in at least 85% of the repeating units.

4. The composition of claim 3 wherein the polyacetal polymer is at least 85 mole percent of polymerized formaldehyde, and up to 15 mole percent of ethylene oxide or 1,3-dioxolane is copolymerized therewith.

5. The composition of claim 3 wherein the polyacetal polymer is produced by the polymerization of 1,3,5-trioxane.

6. The composition of claim 1 wherein, in the linear alternating polymer, G is a moiety of propylene and the ratio of y:x is from about 0.01 to about 0.1.

7. The composition of claim 1 wherein, in the linear alternating polymer, y is zero.

8. An article prepared from the composition of claim 1.

9. An article prepared from the composition of claim 1 and a filler.

10. An article coated with the composition of claim 1.

* * * * *